(12) United States Patent
Hasenkamp

(10) Patent No.: US 11,959,549 B2
(45) Date of Patent: Apr. 16, 2024

(54) PARKING LOCK DEVICE FOR A VEHICLE GEARBOX, AND VEHICLE GEARBOX

(71) Applicant: MERCEDES-BENZ GROUP AG, Stuttgart (DE)

(72) Inventor: Jan Hasenkamp, Allmersbach im Tal (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/014,781

(22) PCT Filed: Jun. 25, 2021

(86) PCT No.: PCT/EP2021/067573
§ 371 (c)(1),
(2) Date: Jan. 6, 2023

(87) PCT Pub. No.: WO2022/008270
PCT Pub. Date: Jan. 13, 2022

(65) Prior Publication Data
US 2023/0349463 A1    Nov. 2, 2023

(30) Foreign Application Priority Data

Jul. 8, 2020 (DE) ..................... 10 2020 004 107.8

(51) Int. Cl.
*F16H 63/34* (2006.01)
*F15B 15/26* (2006.01)

(52) U.S. Cl.
CPC ..... *F16H 63/3425* (2013.01); *F16H 63/3475* (2013.01); *F16H 63/3483* (2013.01); *F15B 15/261* (2013.01)

(58) Field of Classification Search
CPC ..... F15B 15/261; F16H 63/3416–3491; B60T 1/005; B60T 1/062
See application file for complete search history.

(56) References Cited

U.S. PATENT DOCUMENTS 9,267,599 B2    2/2016  Pollack
9,321,435 B2 *  4/2016  Landino .............. F16H 63/3483
(Continued)

FOREIGN PATENT DOCUMENTS

DE         19820920 A1    11/1999
DE      102012004157 A1     9/2013
(Continued)

OTHER PUBLICATIONS

International Search Report and Written Opinion dated Sep. 15, 2021 in related/corresponding International Application No. PCT/EP2021/067573.
(Continued)

*Primary Examiner* — Ernesto A Suarez
*Assistant Examiner* — James J Taylor, II
(74) *Attorney, Agent, or Firm* — PATENT PORTFOLIO BUILDERS PLLC

(57) ABSTRACT

A parking lock device includes a parking lock wheel, a locking pawl moveable between a locked position and an unlocked position, and an operating piston displaceable along a displacement axis. A movement of the locking pawl between the locked position and the unlocked position can be effected. The parking lock device also includes a latch lever pivotable about a pivot axis, and a solenoid by means of which the latch lever can be pivoted from one position to the other position. The pivot axis runs perpendicularly to the displacement axis.

7 Claims, 1 Drawing Sheet

(56) References Cited

U.S. PATENT DOCUMENTS

| | | | |
|---|---|---|---|
| 9,676,374 B2 | 6/2017 | Scherer et al. | |
| 11,168,754 B2* | 11/2021 | Sayama | F16H 63/3433 |
| 2008/0277236 A1* | 11/2008 | Ruhringer | F16H 63/3491 |
| | | | 192/219.6 |
| 2018/0050668 A1 | 2/2018 | Spaulding et al. | |
| 2021/0396309 A1 | 12/2021 | Wetzel et al. | |
| 2023/0349464 A1* | 11/2023 | Haschke | F16H 63/3433 |

FOREIGN PATENT DOCUMENTS

| | | | | |
|---|---|---|---|---|
| DE | 102012012673 A1 * | 12/2013 | | F16H 63/18 |
| DE | 102015008709 A1 | 1/2016 | | |
| DE | 102018216728 A1 | 4/2020 | | |
| EP | 1679456 A1 | 7/2006 | | |
| EP | 3067591 A1 | 9/2016 | | |
| JP | 2008128445 A * | 6/2008 | | F16H 63/3416 |
| JP | 2010143326 A | 7/2010 | | |
| JP | 2014517237 A | 7/2014 | | |
| JP | 2017101754 A | 6/2017 | | |
| JP | 2019183878 A | 10/2019 | | |
| JP | 2020085144 A | 6/2020 | | |

OTHER PUBLICATIONS

Office Action created May 3, 2021 in related/corresponding DE Application No. 10 2020 004 107.8.
Notice of Reasons for Refusal mailed Jan. 9, 2024 in related/corresponding JP Application No. 2022-570414.

* cited by examiner

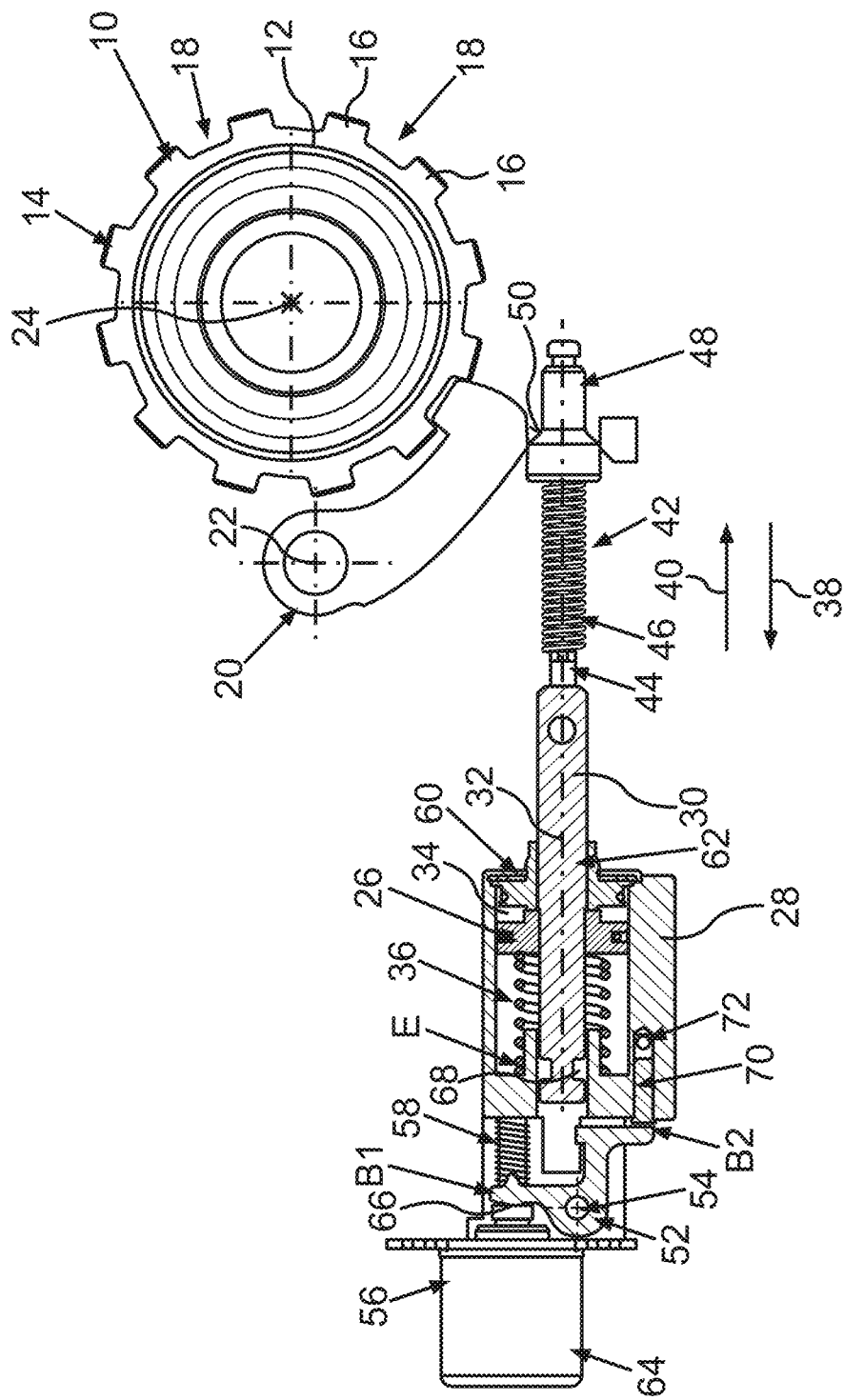

PARKING LOCK DEVICE FOR A VEHICLE GEARBOX, AND VEHICLE GEARBOX

BACKGROUND AND SUMMARY OF THE INVENTION

Exemplary embodiments of the invention relate to a parking lock device for a vehicle gearbox, as well as to a vehicle gearbox.

DE 10 2015 008 709 A1 discloses a parking lock module for mounting in a motor vehicle gearbox, having at least one axially displaceable operating cone, which is provided to operate a locking element provided for form-fitting engagement in a parking lock wheel.

EP 1 679 456 A1, DE 198 20 920 A1, and EP 3 067 591 A1 show parking lock devices having a locking pawl, an operating piston for moving the locking pawl, and a latch lever for arresting the operating piston, in which a pivot axis of the latch lever is arranged perpendicularly to a displacement axis of the operating piston.

DE 10 2018 216 728 A1 and DE 10 2012 004 157 A1, on the other hand, show parking lock devices having an operating piston, in which, while a different latching device is provided rather than a latch lever rotatable about a pivot axis, a direction of action of a solenoid that interacts with the latching device is arranged parallel to the displacement axis of the operating piston.

Exemplary embodiments of the present invention are directed to a parking lock device for a vehicle gearbox and also a vehicle gearbox having a parking lock device of this kind, such that the installation space requirement of the parking lock device can be kept particularly low. The parking lock device should especially be formed such that an installation space requirement of the vehicle gearbox in which the parking lock device is used can be kept low.

A first aspect of the invention relates to a parking lock device also simply described as a parking lock for a vehicle gearbox, in particular provided for a motor vehicle. This means that the vehicle gearbox comprises the parking lock device in its completely manufactured state. The vehicle gearbox has a shaft in its completely manufactured state, for example, which can be driven by a drive motor of the motor vehicle, e.g., designed as an internal combustion engine or an electric motor. The motor vehicle for which the vehicle gearbox is provided additionally has at least one wheel, which can be driven by the drive motor via the shaft. Here, the wheel is connected, or at least can be connected, to the shaft in a torque-transferring manner. The wheel is a ground contact element via which the motor vehicle is supported or can be supported downwards in the vehicle vertical direction on a roadway. If, for example, the motor vehicle is driven along the roadway while the motor vehicle is supported downwards in the vehicle vertical direction onto the roadway via the wheel, then the wheel rolls directly on the roadway. Here the wheel rotates relative to a structure of the motor vehicle that is designed, for example, as a self-supporting body. As explained in more detail in the following, a rotation of the shaft occurring relative to the structure by means of the parking lock device, and thus a rotation of the wheel occurring relative to the structure can be prevented, such that the motor vehicle can be secured against rolling away undesirably by means of the parking lock device, for example, in particular depending on a parking or operating brake of the motor vehicle. This is particularly advantageous when the motor vehicle is stopped, i.e., parked, on an incline.

The vehicle comprises the vehicle gearbox via which the wheel can be driven by the drive motor. The parking lock device is here integrated in the vehicle gearbox, for example, for example a component of the automatic gearbox, which is in particular designed as an automatic gearbox. Here the shaft is a shaft of the vehicle gearbox, for example. The shaft can, in particular, be an output shaft of the vehicle gearbox. If the parking lock device releases the shaft, and thus the wheel, then the shaft and the wheel can rotate relative to a housing of the vehicle gearbox also described as a gearbox housing. The parking lock device can secure the shaft, and thus the wheel, against a rotation occurring relative to the gearbox housing, however, whereby the shaft and the wheel cannot rotate relative to the gearbox housing or relative to the structure. The motor vehicle can thus be secured against rolling away undesirably.

The parking lock device here has a parking lock wheel that is connected or can be connected to the shaft of the vehicle gearbox for conjoint rotation. The parking lock device also comprises a locking pawl that can be moved relative to the parking lock wheel, and for example relative to the gearbox housing, between at least one locked position securing the parking lock wheel against a rotation and at least one unlocked position releasing the parking lock wheel for a rotation. The locking pawl is movably attached to the gearbox housing, for example. The locking pawl can interact with the park locking wheel in the locked position, in particular in a form-fitting manner, whereby the parking lock wheel, and thus the shaft, are secured against a rotation occurring relative to the gearbox housing. The wheel is thus also secured against a rotation, whereby the motor vehicle can be secured against rolling away undesirably. In the unlocked position, the locking pawl, for example, does not interact with the parking lock wheel, such that the parking lock wheel, and thus the shaft, can rotate relative to the gearbox housing in the unlocked position. The wheel can thus also rotate relative to the structure.

The parking lock device further has an operating piston that can be displaced along a displacement axis relative to the parking lock wheel and relative to the locking pawl and preferably also relative to the gearbox housing. A movement of the locking pawl between the locked position and the unlocked position can be effected by displacing the operating piston. By this, the following can in particular be understood: If the operating piston is displaced, for example, in a first direction running parallel to the displacement axis or coinciding with the displacement axis, relative to the parking lock wheel and relative to the locking pawl and relative to the gearbox housing, then a movement of the locking pawl from the unlocked position to the locked position can thus be effected, for example. If, for example, the operating piston is displaced in a second direction running parallel to the displacement axis or coinciding with the displacement axis and against the first direction relative to the parking lock wheel and relative to the locking pawl and also relative to the gearbox housing, then a movement of the locking pawl can thus be effected from the locked position to the unlocked position, for example, in particular such that the operating piston allows a movement of the locking pawl from the locked position to the unlocked position, i.e., does not hinder such a movement of the locking pawl. For example, the operating piston can be displaced in the first direction by means of a mechanical spring, in particular by means of a mechanical compression spring. The operating piston can alternatively or additionally be displaced in the second direction, for example hydraulically, in particular against the mechanical spring, i.e., against a spring force provided by the mechanical spring.

The parking lock device also has a latch lever that can be pivoted about a pivot axis relative to the operating piston, and preferably also relative to the gearbox housing, between at least one arresting position securing the operating piston against a movement occurring along the displacement axis and at least one release position releasing the operating piston for a movement occurring along the displacement axis. Here the arresting position is a first position of the latch lever. In other words, the arresting position is described as the first position. The release position is a second position of the latch lever. In other words, the release position is also described as a second position of the latch lever. For example, the latch lever in the arresting position prevents a displacement of the operating piston in the first direction, which can in particular be effected via the spring force or via the mechanical spring, in particular against the previously mentioned spring force. In the release position, however, the latch lever releases the operating piston, such that in the release position of the latch lever, for example, the operating piston can be displaced in the first direction by means of the mechanical spring, i.e., by means of the spring force provided by the mechanical spring.

The parking lock device also comprises a solenoid by means of which the latch lever can be pivoted from one of the positions to the other position. The one position is preferably the arresting position, such that the other position is preferably the release position. Naturally it is also conceivable, however, that the one position is the release position and the other position is the arresting position. If the one position is the arresting position and the other position is the release position, however, then a particularly high security can be realized, as the latch lever then remains in the arresting position, for example, and in particular can be held without the parking lock device being provided with energy by an additional device provided for the purpose that is outside, i.e., external relative to the parking lock device.

It is provided in a manner known per se that the pivot axis runs perpendicularly to the displacement axis in order to now keep the installation space requirement of the parking lock device particularly low. By this, the following is understood in particular: the pivot axis runs perpendicularly to a first plane, such that the pivot axis is a first plane normal of the first plane. The displacement axis runs perpendicularly to a second plane, such that the displacement axis is a second plane normal of the second plane. Here, the feature that the pivot axis runs perpendicularly to the displacement axis is understood as meaning that the first plane runs perpendicularly to the second plane or vice versa. The invention is based on the knowledge that in conventional parking lock devices, the pivot axis runs parallel to the displacement axis. The solenoid must thus be arranged laterally, and thus inconveniently, resulting in an excessive installation space requirement. Additionally, the latch lever can only be moved from the one position to the other position under very significant friction, i.e., via overuse of a very high friction force, such that the solenoid must be designed in an installation space-, weight- and cost-saving manner.

On the one hand, the solenoid can be arranged in a particularly installation-space-saving manner if the pivot axis runs perpendicularly to the displacement axis or is arranged perpendicularly to the displacement axis, such that the installation space requirement of the parking lock device can overall be kept particularly low. On the other hand, only an extremely low friction force must be overcome by means of the solenoid to pivot the latch lever from the one position to the other position. The solenoid itself can thus be designed in a particularly installation space-, cost- and weight-saving manner.

It is provided in accordance with the invention that the solenoid has a magnet element by means of which a magnetic field is provided or can be provided in order to be able to keep the installation space requirement of the parking lock device and the installation space requirement of a vehicle gearbox comprising the parking lock device particularly low. The magnet element can be a permanent magnet, by means of which the magnetic field is provided in particular permanently. It is further conceivable that the magnetic element is an electromagnet, which for example has at least or exactly one coil. The electromagnet can provide the magnetic field when the electromagnet is supplied with electrical energy, in particular electrical current. If the electromagnet ceases to be supplied with electrical energy, then the provision of the magnetic field via the magnetic element ceases. The latch lever can thus in particular be moved from the one position to the other position as required. The solenoid also has at least one operating element that can be translationally moved in a direction of action relative to the magnet element and relative to the latch lever. This means, for example, that the magnetic field can interact with the operating element, in particular with a material of which the operating element is formed, in such a way that an operating force that acts on the operating element at least indirectly, and in particular directly, and also described as a magnetic field, results. The operating element can be translationally moved in the direction of action relative to the magnet element and relative to the latch lever by means of the operating force, whereby the latch lever can be pivoted from one position to the other position. In other words, again, if the operation element is translationally moved by means of the magnetic field or by means of the magnetic force in effect, then the latch lever is thus pivoted from the one position to the other position. The direction of action runs parallel to the displacement axis or the direction of action coincides with the displacement axis in order to thus keep the installation space requirement particularly low.

It is further provided in accordance with the invention that the solenoid, the latch lever, and the operating piston are arranged in succession along the displacement axis, i.e., along a straight line running parallel to the displacement axis or coinciding with the displacement axis, in the following order: solenoid, latch lever, operating piston. The installation space requirement of the vehicle gearbox comprising the parking lock device can thus be further reduced.

The parking lock device further has an operating cone, for example, which can be displaced relative to the locking pawl and relative to the parking lock wheel and also relative to the gearbox housing by displacing the operating piston along the displacement axis. Here the operating piston is coupled with the operating cone, for example, or vice versa. The operating cone is in particular coupled with the operating piston in such a way that the operating cone can be displaced in the first direction relative to the parking lock wheel and relative to the locking pawl by a displacement of the operating piston occurring in the first direction, whereby the locking pawl can be moved from the unlocked position to the locked position via the operating cone or by means of the operating cone. The operating cone can, for example, be displaced in the second direction relative to the locking pawl and relative to the parking lock wheel via displacement of the operating piston occurring in the second direction, whereby the locking pawl can be moved from the locked position to the unlocked position, i.e., whereby the operating cone allows a movement of the locking pawl from the locked position to the unlocked position. For example, the operating cone has an outer-circumferential outer surface that is cone-shaped, i.e., that is designed in a conical or frustoconical shape, and broadens in the second direction or tapers in the first direction, for example. If the operating cone is displaced in the first direction, for example, then the cone-shaped outer-circumferential outer surface slides against the locking pawl, wherein the locking pawl is moved from the unlocked to the locked position. If, for example, the operating cone is then displaced in the second direction, then the locking pawl can consequently be moved from the locked position to the unlocked position.

Here it is preferably provided that the solenoid, the latch lever also described as a detent lever, the operating piston and the operating cone are arranged in succession along the displacement axis that for example coincides with an axial direction, in particular of the solenoid, in the following order: solenoid, latch lever, operating piston, operating cone. In this way, the installation space requirement can be kept particularly low.

A further embodiment is characterized in that the locking pawl can be pivoted, and thus moved, about a locking pawl axis between the unlocked position and the locked position relative to the parking lock wheel and preferably also relative to the gearbox housing. It is preferably provided that the locking pawl axis runs perpendicularly to the displacement axis in order to be able to keep the installation space requirement of the parking lock wheel particularly low. The pivot axis thus runs parallel to the pivot axis and therefore perpendicularly to the first plane.

It has here proved particularly advantageous when the parking lock wheel, and thus the shaft, can be rotated about a rotational axis relative to the operating piston, and thus relative to the gearbox housing, in the unlocked position, and are secured against a rotation occurring about the rotational axis by means of the locking pawl in the locked position. It is preferably provided that the rotational axis runs parallel to the locking pawl axis, and thus parallel to the pivot axis, and thus perpendicularly to the first plane, in order to keep the installation space requirement particularly low.

In a further, particularly advantageous embodiment of the invention, the parking lock device comprises a piston rod which is arranged coaxially to the operating piston and which can be displaced with the operating piston along the displacement direction relative to the locking pawl and relative to the parking lock wheel and relative to the gearbox housing. The piston rod has a recess, also described as an engaging contour, in particular on its end facing the latch lever, and the latch lever can be at least partially received or is received in the recess in the arresting position. The operating piston can thus be secured against a movement occurring along the displacement axis. In other words, the latch lever can engage in the corresponding engaging contour in the arresting position, whereby the latch lever can interact with the operating piston in a form-fitting manner. In this way, the operating piston can be secured against displacing undesirably, in particular in the first direction, in a particularly installation-space-saving and secure manner.

Here it has proved particularly advantageous when the operating piston is formed separately from the piston rod, is arranged on the piston rod, and is attached to the piston rod at least along the displacement axis.

In a further embodiment of the invention, it is provided that the operating piston is pressed onto the piston rod, and is thus fixed to the piston rod at least along the displacement axis, in order to be able to keep the installation space requirement particularly low.

In a further embodiment of the invention, it is provided that the parking lock device has a movement element that is provided additionally to the solenoid and that can be translationally moved, hydraulically, in a direction of movement running parallel to the displacement axis relative to the latch lever, whereby the latch lever can be pivoted from the one position to the other position, in order to be able to realize a particularly high security of the parking lock device in a particularly installation-space-saving manner.

A second aspect of the invention relates to a vehicle gearbox that has a parking lock device according to the first aspect of the invention. Advantages and advantageous embodiments of the first aspect of the invention should be seen as advantages and advantageous embodiments of the second aspect of the invention, and vice versa.

Further advantages, features and details of the invention will become clear from the following description of a preferred exemplary embodiment and with reference to the drawing.

BRIEF DESCRIPTION OF THE SOLE DRAWING

The sole FIGURE illustrates a parking lock device for a motor vehicle.

DETAILED DESCRIPTION

The sole FIGURE shows a parking lock device 10, also simply described as a parking lock, for a motor vehicle (not depicted), in particular for a vehicle gearbox (not further depicted) of a motor vehicle in a schematic and partially cross-sectional view. The motor vehicle has a drive motor, a vehicle gearbox, and at least two wheels also described as vehicle wheels that can be operated by the drive motor via the vehicle gearbox. The entire motor vehicle is driven in this way. The parking lock device 10 is here part of the vehicle gearbox. The vehicle gearbox has a gearbox housing and a shaft, for example an output shaft of the vehicle gearbox that is permanently coupled with the wheels in a torque-transferring manner.

The parking lock device 10 here has a parking lock wheel 12 that is arranged coaxially to the shaft and is arranged on the shaft and that can be connected for conjoint rotation to the shaft, in particular permanently. The parking lock wheel 12 has a toothing 14 that has teeth 16 arranged following one another and spaced apart from each other in the circumferential direction of the parking lock wheel 12. A particular tooth gap 18 of the toothing 14 is arranged between each tooth 16 and the next following one another directly or indirectly in the circumferential direction of the parking lock wheel 12.

The parking lock device 10 also has a locking pawl 20 that can be pivoted about a locking pawl axis 22 relative to the parking lock wheel 12 and relative to the gearbox housing between at least one locked position shown in the FIGURE and at least one unlocked position. The locking pawl 20 engages in a tooth gap 18, and thus in the toothing 14, in the locked position, whereby the locking pawl 20 interacts with the parking lock wheel 12 in a form-fitting manner, and via the latter with the shaft. The parking lock wheel 12, and thus the shaft, are thus secured against a rotation occurring about the rotational axis 24 and relative to the gearbox housing by means of the locking pawl 20 in the locked position. In other words, the parking lock wheel 12, and thus the shaft, cannot rotate about the rotational axis 24 relative to the gearbox housing in the locked position. In the unlocked position, however, the locking pawl 20 does not engage with the parking lock wheel 12, such that the locking pawl 20 does not engage with the toothing 14 in the unlocked position. The locking pawl 20 thus releases the parking lock wheel 12, and therefore the shaft, for a rotation occurring about the rotational axis 24 relative to the gearbox housing in the unlocked position.

The parking lock device 10 also comprises an operating piston 26, which is received in a translationally movable manner in a housing 28 of the parking lock device 10. The parking lock device 10 further comprises a piston rod 30, wherein the operating piston 26 is formed separately from the piston rod 30, and is connected, in particular fixedly, to the piston rod 30. In this way, the operating piston 26, and with it the piston rod 30, can be displaced along a displacement axis 32 relative to the parking lock wheel 12, relative to the locking pawl 20, relative to the housing 28, and relative to the gearbox housing, whereby a movement of the locking pawl 20 between the locked position and the unlocked position can be effected. The operating piston 26 and the housing 28 each partially border a working chamber 34, into which a fluid, in particular a hydraulic fluid, can be introduced. The parking lock device 10 also comprises a mechanical spring 36 functioning as a mechanical compression spring, which is supported or can be supported along the displacement axis at least indirectly, in particular directly on the operating piston 26 on the one hand and at least indirectly, in particular directly on the housing 28 on the other. If the hydraulic fluid is introduced into the working chamber 34, then the operating piston 26, also simply described as a piston, and with the piston the piston rod 30, are displaced in a first direction relative to the housing 28 visualized by an arrow 38 in the FIGURE and running parallel to the displacement axis 32 or coinciding with the displacement axis 32. In this way, the spring 36 is compromised, whereby the spring 35 provides a spring force. The spring force acts in a second direction visualized by an arrow 40 in the FIGURE that runs against the first direction and parallel to the displacement axis 32 or coincides with the displacement axis 32. If the hydraulic fluid is let out of the working chamber 34 or if the hydraulic fluid is allowed to flow out of the working chamber 34, then the spring 36 can at least partially relax. The piston, and with it the piston rod 30, are consequently displaced along the displacement axis 32 in the second direction relative to the housing 28 by means of the spring 36, i.e., by means of spring force provided by the spring 36.

The parking lock device 10 also comprises a switching linkage 42 that has a switching rod 44, a further, mechanical spring 46 and an operating cone 48 also described as a cone or locking cone. The switching rod 44 is, for example, also formed separately from the piston rod 30, and coupled with the piston rod 30, in particular in a hinged manner, in particular such that the switching rod 44 can be displaced with the piston rod 30 along the displacement axis. If the piston rod 30 is thus displaced in the first direction relative to the housing 28, for example, then the switching rod 44 is thus displaced with the piston rod 30 in the first direction relative to the housing 28. If the piston rod 30 is displaced in the second direction, then the switching rod 44 is thus displaced in the second direction relative to the housing 28 with the piston rod 30. The operating cone 48 can be displaced in the axial direction of the switching rod 44 relative to the switching rod 44, for example. The operating cone 48 can in particular be arranged on the switching rod 44 in a displaceable manner in the axial direction of the switching rod 44 relative to the switching rod 44. The operating cone 48 is thus guided by means of the switching rod 44, for example, when the operating cone 48 is displaced relative to the switching rod 44. The operating cone 48 is supported or can be supported in the axial direction of the switching rod 44 on the switching rod 44 via the spring 46 also described as a locking cone spring. In other words, the spring 46 is supported or can be supported in the axial direction of the switching rod 44 at least indirectly, in particular directly on the operating cone 48 on the one hand and at least indirectly, in particular directly on the switching rod 44 on the other. The axial direction of the switching rod 44, for example, coincides with the displacement axis 32 in at least one position of the switching rod 44 relative to the piston rod 30. This is shown in the FIGURE. If, for example, the operating cone 48 is displaced in the first direction relative to the switching rod 44, then the spring 46 is thus compressed such that the spring 46 provides a spring force. The operating cone 48 can be displaced in the second direction relative to the switching rod 44 by means of the spring force.

The only FIGURE shows the parking lock device 10 in an engaged or activated state of the parking lock device 10. The locking pawl 20 is in its locked position in the engaged or activated state. To disengage or deactivate the parking lock device 10, i.e., to bring the parking lock device 10 from its engaged state to its disengaged or deactivated state, in which the locking pawl 20 releases the parking lock wheel 12 for a rotation occurring about a rotational axis 24 and relative to the gearbox housing, the piston, and thus the piston rod 30 and the switching rod 44, and via these the operating cone 48, are displaced in the first direction relative to the housing 28. A movement of the locking pawl 20 from the locked position to the unlocked position is thus effected or allowed. In all, it can be seen that the switching linkage 42 can be displaced with the piston rod 30 along the displacement axis 32 relative to the housing 28.

The hydraulic fluid is allowed to flow out of the working chamber 34 in order to engage or activate the parking lock device 10. The piston, and thus the piston rod 30 and the switching rod 44 are consequently displaced in the second direction relative to the housing 28 by means of the spring 36. If the parking lock wheel is here in such a rotational position that the locking pawl 20 can engage in one of the tooth gaps 18, then the operating cone 48, in particular a cone-shaped outer-circumferential outer surface 50 of the operating cone 48 slides against the locking pawl 20 such that the locking pawl 20 is moved from the unlocked position to the locked position by means of the outer surface 50.

If, however, a so-called tooth-to-tooth position occurs, in which the locking pawl 20 cannot be moved into engagement with one of the tooth gaps 18, but rather comes into a supporting position with one of the teeth 16, whereby a movement of the locking pawl 20 from the unlocked position to the locked position is prevented, then a movement of the operating cone 48 in the first direction is firstly avoided despite the fact that the piston, the piston rod 30 and the switching rod 44 are moved in the first direction relative to the housing 28, whereby the spring 46 is tensioned, in particular compressed. The spring 46 thus exerts a spring force on the operating cone 48. If, for example, the motor vehicle then rolls further, such that the shaft, and thus the parking lock wheel 12, are rotated about the rotational axis 24 relative to the gearbox housing, such that the tooth-totooth position is raised and the locking pawl 20 can consequently be moved into one of the tooth gaps 18, then the spring 46 relaxes such that the operating cone 48 is moved in the first direction relative to the housing 28 by means of the spring 46. Here, the outer surface 50 slides against the locking pawl 20, whereby the locking pawl 20 moves into one of the tooth gaps 18, and thus into the locked position.

The parking lock device 10 also has a latch lever 52 also described as a detent lever that can be pivoted between at least one arresting position shown in the FIGURE and at least one release position about a pivot axis 54 relative to the gearbox housing 28. In the arresting position, the piston rod 30, and thus the operating piston 26, are secured against a displacement occurring in the second direction relative to the housing 28 against the spring force provided by the spring 36, in particular in a form-fitting manner, by means of the latch lever 52 when the parking lock device 10 is disengaged, whereby an undesirable engagement of the parking lock device 10 effected by the spring force provided by the spring 36 is avoided. In the release position, however, the latch lever 52 releases the piston rod 30 and the operating piston 26 for a displacement occurring in the second direction relative to the housing 28, and for example effected or able to be effected by means of the spring force provided by the spring 36, such that the spring 36 can displace the piston rod 30, and via the latter the operating piston 26 in the second direction relative to the housing 28, and consequently effect a movement of the locking pawl 20 from the unlocked position to the locked position in the release position.

The park locking device 10 additionally comprises an actuator designed as a solenoid 56, by means of which the latch lever 52 can be pivoted from the arresting position to the release position about the pivot axis 54 relative to the housing 28 with use of electrical energy or electrical current. Based on the image plane of the sole FIGURE, the solenoid 56 can pivot the latch lever 52 clockwise relative to the housing 28, and thus pivot it from the arresting position to the release position. For this purpose, the solenoid 56 can interact at least indirectly, in particular directly with a first region B1 of the latch lever 52. This means that the solenoid 56, in particular an operating element of the solenoid 56, can exert a force over the region B1 of the latch lever 52. This force leads to a torsional moment acting about the pivot axis 54 and which acts clockwise based on the image plane of the FIGURE. The latch lever 52 is thus pivoted from the arresting position to the release position. It can be seen that the latch lever 52 can be pivoted about the pivot axis 54 in a first pivot or rotational direction, and can thus be pivoted from the arresting position to the release position. Here the latch lever 52 is assigned to a further mechanical spring 58 that is also described as a return spring. If the latch lever 52 is pivoted in the first rotational direction, and thus from the arresting position to the release position, then the spring 58 is tensioned, in particular compressed. The spring 58 consequently provides a spring force that acts on the latch lever 52 such that a second torque acts from the spring force provided by the spring 58 and acting on the latch lever 52, the second torque acting in a second rotational direction against the first rotational direction about the pivot axis 54. The latch lever 52 can thus be pivoted in the second rotational direction, and thus from the release position back into the arresting position, and in particular can be held in the arresting position by means of the second torque, in particular after the latch lever has been pivoted in the first rotational direction. Here, the spring 58 is supported or can be supported at least indirectly, in particular directly on the latch lever 52 on the one hand and at least indirectly, in particular directly on the housing 28 on the other.

The pivot axis 54 runs perpendicularly to the displacement axis 32 in order to here be able to keep the installation space requirement of the parking lock device 10 particularly low. In other words, the pivot axis 54 is arranged perpendicularly to the displacement axis 32.

The parking lock device 10 also comprises a cover element 60 which is formed separately from the housing 28 and is connected to the housing 28, and by which the working chamber 34 is partially delimited. The cover element 60 has a through-opening 62 that is permeated by the piston rod 30. The cover element 60 is thus a piston rod guide, by means of which the piston rod 30 is guided or should be guided when its displacements occur relative to the housing 28 and relative to the cover element 60 and along the displacement axis 32.

The solenoid 56 has at least one magnet element 64 depicted in the FIGURE particularly schematically, which is designed as an electromagnet, for example. A magnetic field is provided or can be provided by means of the magnet element 64. The solenoid 56 additionally comprises an operating element 66, which can be translationally moved, i.e., displaced in a direction of action that is visualized by the arrow and thus coincides with the second direction relative to the magnet element 64, relative to the latch lever 52 and relative to the housing 28 by means of the magnetic field. If the operating element 66 is displaced in the direction of action and thus in the second direction by means of the magnet element 64, then the operating element 66 exerts the previously mentioned force on the region B1, whereby the latch lever 52 is pivoted in the first rotational direction relative to the housing 28. The latch lever 52 is thus pivoted from the arresting position to the release position. Here the direction of action runs parallel to the displacement axis 32 or the direction of action coincides with the displacement axis 32. The solenoid 56, the latch lever 52, the piston rod 30, and the switching linkage 42 are additionally arranged in succession along the displacement axis 32 in the following order: solenoid 56, latch lever 52, operating piston 26, switching linkage 42. Furthermore, the locking pawl axis 22 also runs perpendicularly to the displacement axis 32. The rotational axis 24 runs parallel to the locking pawl axis 22, and thus also perpendicularly to the displacement axis 32.

The piston rod 30 has a recess 68 also described as an engaging contour, in particular on its end E facing towards the latch lever 52, the recess extending, for example, in the circumferential direction of the piston rod 30, completely encircling the piston rod 30, in order to secure the operating piston 26 and the piston rod 30 along the displacement axis 32 particularly securely against a displacement occurring in the second direction and relative to the housing 28. If the parking lock device 10 is disengaged, and if the latch lever 52 is in its arresting position, then the latch lever 52 engages in the recess 68, whereby the piston rod 30, and thus the operating piston 26 are secured in a form-fitting manner against a displacement along the displacement axis 32.

The parking lock device 10 also has a movement element that is provided in addition to the solenoid 56 and that is external in relation to the solenoid 56 and is in the form of a piston 70, which partially delimits a further working chamber 72 provided in addition to the working chamber 34. The working chamber 72 is also partially delimited by the housing 28. A or the hydraulic fluid can be introduced into the working chamber 72. The piston 70 is thus displaced in the first direction relative to the housing 28. The piston 70 thus exerts a second force on a second region B2 of the latch lever 52. This second force leads to a further torque, which acts in the first rotational direction about the pivot axis 54. The latch lever 52 can thus also be pivoted from the arresting position to the release position by means of the piston 70. Here the region B1 is arranged on the other side of the pivot axis 54, while the region B2 is arranged on this side of the pivot axis 54, in particular in relation to a direction running perpendicularly to the pivot axis 54 and perpendicularly to the displacement axis 32.

The described arrangement of the solenoid 56, the latch lever 52, the piston rod 30, and the switching rod 44 in series enables a configuration of the solenoid 56 that is particularly slim, and therefore installation-space-saving and weight-saving. Reaction forces on the latch lever 52 are only supported on the pivot axis 54, wherein the reaction forces result, for example, from the fact that the spring 58 holds the latch lever 52 in the arresting position by means of a spring force, whereby the latch lever 52 pivots from the arresting position to the release position with particularly low friction, and can thus be unlocked. The solenoid 56 thus only needs to exert a low operating force on the latch lever 52 to unlock the latch lever 52, whereby the solenoid 56 can have particularly space-saving dimensions. The installation space requirement and the weight of the parking lock device 10 can thus be kept particularly low.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

- 10 parking lock device
- 12 parking lock wheel
- 14 toothing
- 16 tooth
- 18 tooth gap
- 20 locking pawl
- 22 locking pawl axis
- 24 rotational axis
- 26 operating piston
- 28 housing
- 30 piston rod
- 32 displacement axis
- 34 working chamber
- 36 spring
- 38 arrow
- 40 arrow
- 42 switching linkage
- 44 switching rod
- 46 spring
- 48 operating cone
- 50 outer-circumferential outer surface
- 52 latch lever
- 54 pivot axis
- 56 solenoid
- 58 spring
- 60 cover element
- 62 through-opening
- 64 magnet element
- 66 operating element
- 68 recess
- 70 piston
- 72 working chamber
- B1, B2 region
- E end

The invention claimed is:

1. A parking lock device for a vehicle gearbox, the parking lock device comprising:
    a parking lock wheel that is connectable to a shaft of the vehicle gearbox for conjoint rotation;
    a locking pawl moveable relative to the parking lock wheel between at least one locked position securing the parking lock wheel against the conjoint rotation and at least one unlocked position releasing the parking lock wheel for the conjoint rotation;
    an operating piston displaceable along a displacement axis relative to the parking lock wheel and relative to the locking pawl to effect a movement of the locking pawl between the locked position and the unlocked position;
    a latch lever pivotable about a pivot axis relative to the operating piston between at least one arresting position securing the operating piston against a movement occurring along the displacement axis as a first position, and at least one release position releasing the operating piston for the movement occurring along the displacement axis as a second position;
    a solenoid configured to pivot the latch lever from one of the first and second positions to the other position of the first and second positions; and
    a movement element translationally moveable, hydraulically, in a direction of movement running parallel to the displacement axis relative to the latch lever so that the latch lever is pivoted from the first position to the second position or from the second position to the first position,
    wherein the pivot axis runs perpendicularly to the displacement axis,
    wherein the solenoid has at least one magnet element configured to provide a magnetic field and at least one operating element translationally moveable in a direction of action relative to the magnet element and relative to the latch lever due to the magnetic field so that the latch lever is pivoted from one of the first and second positions to the other one of the first and second positions,
    wherein the direction of action runs parallel to the displacement axis or coincides with the displacement axis,
    wherein the solenoid, the latch lever and the operating piston are arranged in succession along the displacement axis in the following order, solenoid, latch lever, and operating piston.

2. The parking lock device of claim 1, wherein the locking pawl is pivotable, and thus moveable, between the unlocked and the locked position about a locking pawl axis, wherein the locking pawl axis runs perpendicularly to the displacement axis.

3. The parking lock device of claim 2, wherein the parking lock wheel is rotatable about a rotational axis in the unlocked position and is secured against the conjoint rotation occurring about the rotational axis by the locking pawl in the locked position, wherein the rotational axis runs parallel to the locking pawl axis.

4. The parking lock device of claim 1, further comprising:
a piston rod arranged coaxially to the operating piston and displaceable along the displacement axis with the operating piston, wherein the piston rod has at least one recess configured to at least partially receive the latch lever in the arresting position so that the operating piston is to be secured against the movement occurring along the displacement axis.

5. The parking lock device of claim 4, wherein the operating piston is formed separately from the piston rod, is arranged on the piston rod, and is attached to the piston rod at least along the displacement axis.

6. The parking lock device of claim 5, wherein the operating piston is pressed onto the piston rod and is thus attached to the piston rod at least along the displacement axis.

7. A vehicle gearbox, comprising:
a parking lock device, which comprises
  a parking lock wheel that is connectable to a shaft of the vehicle gearbox for conjoint rotation;
  a locking pawl moveable relative to the parking lock wheel between at least one locked position securing the parking lock wheel against the conjoint rotation and at least one unlocked position releasing the parking lock wheel for the conjoint rotation;
  an operating piston displaceable along a displacement axis relative to the parking lock wheel and relative to the locking pawl to effect a movement of the locking pawl between the locked position and the unlocked position;
  a latch lever pivotable about a pivot axis relative to the operating piston between at least one arresting position securing the operating piston against a movement occurring along the displacement axis as a first position, and at least one release position releasing the operating piston for the movement occurring along the displacement axis as a second position;
  a solenoid configured to pivot the latch lever from one of the first and second positions to the other position of the first and second positions; and
  a movement element translationally moveable, hydraulically, in a direction of movement running parallel to the displacement axis relative to the latch lever so that the latch lever is pivoted from the first position to the second position or from the second position to the first position,
  wherein the pivot axis runs perpendicularly to the displacement axis,
  wherein the solenoid has at least one magnet element configured to provide a magnetic field and at least one operating element translationally moveable in a direction of action relative to the magnet element and relative to the latch lever due to the magnetic field so that the latch lever is pivoted from one of the first and second positions to the other one of the first and second positions,
  wherein the direction of action runs parallel to the displacement axis or coincides with the displacement axis,
  wherein the solenoid, the latch lever and the operating piston are arranged in succession along the displacement axis in the following order, solenoid, latch lever, and operating piston.

* * * * *